(12) United States Patent
Hayashi

(10) Patent No.: US 11,846,720 B2
(45) Date of Patent: Dec. 19, 2023

(54) FREQUENCY SWEEP CIRCUIT AND RADAR DEVICE

(71) Applicant: SOCIONEXT INC., Kanagawa (JP)

(72) Inventor: Joji Hayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 554 days.

(21) Appl. No.: 17/119,639

(22) Filed: Dec. 11, 2020

(65) Prior Publication Data

US 2021/0096212 A1 Apr. 1, 2021

Related U.S. Application Data

(63) Continuation of application No. PCT/JP2018/023996, filed on Jun. 25, 2018.

(51) Int. Cl.
*G01S 7/35* (2006.01)
*G01S 13/34* (2006.01)

(52) U.S. Cl.
CPC ............... *G01S 7/35* (2013.01); *G01S 13/34* (2013.01)

(58) Field of Classification Search
CPC ...... G01S 13/34; G01S 13/343; G01S 13/345; G01S 7/53
See application file for complete search history.

(56) References Cited

U.S. PATENT DOCUMENTS

| 6,114,987 A * | 9/2000 | Bjornholt | H03B 23/00 |
| | | | 331/4 |
| 6,384,770 B1 * | 5/2002 | de Gouy | G01S 7/4008 |
| | | | 342/135 |
| 6,396,436 B1 * | 5/2002 | Lissel | G01S 13/931 |
| | | | 342/131 |
| 6,856,280 B1 * | 2/2005 | Eder | G01S 13/424 |
| | | | 342/146 |

(Continued)

FOREIGN PATENT DOCUMENTS

JP 2009-194428 A 8/2009
WO 2017/056287 A1 4/2017

OTHER PUBLICATIONS

Japanese Office Action issued in corresponding Japanese Application No. 2020-526729, dated Apr. 26, 2022, with partial English Translation.

(Continued)

*Primary Examiner* — Peter M Bythrow
(74) *Attorney, Agent, or Firm* — McDermott Will & Emery LLP

(57) ABSTRACT

A divider control circuit outputs a divider control signal that is meant to increase the division ratio from a first division ratio through a second division ratio greater than the first division ratio to a third division ratio greater than the second division ratio and then return the division ratio through a fourth division ratio smaller than the third division ratio to a fifth division ratio smaller than the fourth division ratio and (Continued)

greater than the first division ratio. Moreover, control is exerted so that the absolute value of the time rate of change of the division ratio in the increase from the second division ratio to the third division ratio is smaller than the absolute value of the time rate of change of the division ratio in the increase from the first division ratio to the second division ratio.

8 Claims, 10 Drawing Sheets

(56) References Cited

U.S. PATENT DOCUMENTS

| | | | | |
|---|---|---|---|---|
| 6,864,832 | B2* | 3/2005 | Mende | G01S 13/34 |
| | | | | 342/70 |
| 7,071,868 | B2* | 7/2006 | Woodington | H01Q 1/3258 |
| | | | | 342/159 |
| 8,390,506 | B2* | 3/2013 | Focke | G01S 13/931 |
| | | | | 342/112 |
| 8,902,103 | B2* | 12/2014 | Kim | G01S 13/345 |
| | | | | 342/134 |
| 9,024,809 | B2* | 5/2015 | Testar | G01S 13/343 |
| | | | | 342/128 |
| 9,219,487 | B1* | 12/2015 | Stuhlberger | H03L 7/197 |
| 9,971,028 | B2* | 5/2018 | Park | G01S 13/345 |
| 11,029,405 | B2* | 6/2021 | Moss | G01S 13/931 |
| 11,360,215 | B2* | 6/2022 | Singer | G01S 7/4808 |
| 2003/0052813 | A1* | 3/2003 | Natsume | G01S 13/345 |
| | | | | 342/107 |
| 2008/0061891 | A1* | 3/2008 | Hongo | G01S 7/35 |
| | | | | 327/156 |
| 2008/0100500 | A1* | 5/2008 | Kondoh | G01S 7/0232 |
| | | | | 342/109 |
| 2008/0122680 | A1* | 5/2008 | Morinaga | G01S 7/352 |
| | | | | 342/104 |
| 2008/0291078 | A1* | 11/2008 | Hilsebecher | B60R 21/0134 |
| | | | | 342/70 |
| 2010/0277361 | A1* | 11/2010 | Focke | G01S 13/345 |
| | | | | 342/133 |
| 2010/0315138 | A1* | 12/2010 | Namba | H03L 7/197 |
| | | | | 327/157 |
| 2011/0122014 | A1* | 5/2011 | Szajnowski | G01S 13/345 |
| | | | | 342/109 |
| 2011/0285575 | A1* | 11/2011 | Landez | G01S 7/032 |
| | | | | 342/70 |
| 2012/0050093 | A1* | 3/2012 | Heilmann | G01S 13/931 |
| | | | | 342/173 |
| 2012/0235854 | A1* | 9/2012 | Testar | G01S 13/343 |
| | | | | 342/109 |
| 2015/0378016 | A1* | 12/2015 | Schoor | G01S 13/931 |
| | | | | 342/21 |
| 2016/0131741 | A1* | 5/2016 | Park | G01S 13/42 |
| | | | | 342/194 |
| 2016/0344397 | A1* | 11/2016 | Matsumura | G01S 13/34 |
| 2017/0131391 | A1* | 5/2017 | Chen | H04L 1/0053 |
| 2017/0146647 | A1* | 5/2017 | Lim | G01S 7/352 |
| 2017/0285139 | A1* | 10/2017 | Higuchi | G01S 13/345 |
| 2018/0123537 | A1* | 5/2018 | Salle | H03L 7/16 |
| 2018/0123605 | A1* | 5/2018 | Salle | G01S 13/343 |
| 2018/0136328 | A1* | 5/2018 | Moss | G01S 7/354 |
| 2018/0175868 | A1* | 6/2018 | Stuhlberger | H03C 3/0941 |
| 2018/0203105 | A1* | 7/2018 | Kuehnle | G01S 13/0209 |
| 2018/0267159 | A1* | 9/2018 | Wada | G01S 7/4017 |
| 2018/0328772 | A1* | 11/2018 | Schultheiss | G01S 7/036 |
| 2018/0372843 | A1* | 12/2018 | Greslehner-Nimmervoll | |
| | | | | G01S 7/4056 |
| 2019/0361113 | A1* | 11/2019 | Ray | G01S 7/285 |

OTHER PUBLICATIONS

International Search Report issued in corresponding International Patent Application No. PCT/JP2018/023996, dated Sep. 11, 2018, with English translation.

* cited by examiner

FIG.6

| Step | Tc | ΔN | Nstart |
|---|---|---|---|
| #0 | Tc10 | 0 | N1 |
| #1 | Tc21 | ΔN1 | N1 |
| #2 | Tc22 | ΔN2 | N2 |
| #3 | Tc23 | 0 | N3 |
| #4 | Tc11 | ΔN3 | N3 |
| #5 | Tc12 | ΔN4 | N4 |
| #6 | Tc13 | 0 | N11 (N1+Nstep) |
| #7 | Tc21 | ΔN1 | N11 (N1+Nstep) |
| #8 | Tc22 | ΔN2 | N12 (N2+Nstep) |
| #9 | Tc23 | 0 | N13 (N3+Nstep) |
| . | . | . | . |
| . | . | . | . |
| . | . | . | . |
| #(6*(X-1)+4) | Tc21 | ΔN1 | N1+(X-1)*Nstep |
| #(6*(X-1)+5) | Tc22 | ΔN2 | N2+(X-1)*Nstep |
| #(6*(X-1)+6) | Tc23 | 0 | N3+(X-1)*Nstep |

FREQUENCY SWEEP CIRCUIT AND RADAR DEVICE

CROSS-REFERENCE TO RELATED APPLICATIONS

This is a continuation of International Application No. PCT/JP2018/023996 filed on Jun. 25, 2018. The entire disclosure of this application is incorporated by reference herein.

BACKGROUND

The present disclosure relates to a frequency sweep circuit and a radar device using the same.

Various radar sensors that perform distance measurement using a microwave and a millimeter wave adopt methods such as frequency modulated continuous wave (FMCW), frequency modulated shift keying (FMSK), and pulse modulation.

For example, U.S. Pat. No. 6,864,832 discloses use of transmission waves that have a frequency spacing from each other and each have frequency steps whereby the output frequency is shifted stepwise, in a radar device, for improvement of the precision of measurement of distance and speed.

SUMMARY

In general, in order to generate transmission waves as described above, a frequency sweep circuit uses a phase locked loop (PLL) circuit provided with a voltage-controlled oscillator (VCO). This circuit configuration has a problem that overshoots/undershoots arise in the transmission waves every time the output frequency is switched from one to another. This is particularly apparent in transmission waves having a frequency spacing therebetween.

Once such an overshoot/undershoot arises in the output frequency, the transmission is suspended until the overshoot/undershoot ceases. It is therefore unable to secure a long sensing period for performing distance measurement, etc., resulting in reduction in the S/N ratio of the measured value. It is further unable to satisfy the restrictions of the occupied frequency bandwidth specified in the Radio Act, etc. If the blank period is extended to solve this problem, the precision of measurement of distance and speed will be degraded.

An objective of the present disclosure is solving the above-described problem.

According to the first aspect of the present disclosure, a frequency sweep circuit configured to output a plurality of oscillation signals having a frequency spacing between the signals includes: an input terminal into which a reference frequency signal is input; an output terminal connected to an output frequency signal; a voltage-controlled oscillator that outputs the output frequency signal based on a phase-compared signal; a divider control circuit that outputs a divider control signal; a frequency divider into which the output frequency signal is input and that divides the frequency of the output frequency signal by a division ratio specified by the divider control signal and outputs a divided frequency signal; and a phase comparator that compares phases between the reference frequency signal and the divided frequency signal and outputs the phase-compared signal, wherein the divider control circuit outputs the divider control signal that is meant to increase the division ratio from a first division ratio through a second division ratio greater than the first division ratio to a third division ratio greater than the second division ratio and then return the division ratio through a fourth division ratio smaller than the third division ratio to a fifth division ratio smaller than the fourth division ratio and greater than the first division ratio, and control is exerted so that the absolute value of a time rate of change of the division ratio in the increase from the second division ratio to the third division ratio is smaller than the absolute value of a time rate of change of the division ratio in the increase from the first division ratio to the second division ratio.

According to the first aspect described above, in comparison between the period of increase of the division ratio from the first division ratio to the second division ratio and the period of increase of the division ratio from the second division ratio to the third division ratio, the absolute value of the time rate of change of the division ratio is smaller during the latter. Therefore, transient variations are less likely to occur.

According to the second aspect of the present disclosure, a frequency sweep circuit configured to output a plurality of oscillation signals having a frequency spacing set between the signals includes: an input terminal into which a reference frequency signal is input; an output terminal connected to an output frequency signal; a voltage-controlled oscillator that outputs the output frequency signal based on a phase-compared signal; a divider control circuit that outputs a divider control signal; a frequency divider into which the output frequency signal is input and that divides the frequency of the output frequency signal by a division ratio specified by the divider control signal and outputs a divided frequency signal; and a phase comparator that compares phases between the reference frequency signal and the divided frequency signal and outputs the phase-compared signal, wherein the divider control circuit outputs the divider control signal that is meant to decrease the division ratio from a first division ratio through a second division ratio smaller than the first division ratio to a third division ratio smaller than the second division ratio and then return the division ratio through a fourth division ratio greater than the third division ratio to a fifth division ratio greater than the fourth division ratio and smaller than the first division ratio, and control is exerted so that the absolute value of a time rate of change of the division ratio in the decrease from the second division ratio to the third division ratio is smaller than the absolute value of a time rate of change of the division ratio in the decrease from the first division ratio to the second division ratio.

According to the second aspect described above, in comparison between the period of decrease of the division ratio from the first division ratio to the second division ratio and the period of decrease of the division ratio from the second division ratio to the third division ratio, the absolute value of the time rate of change of the division ratio is smaller during the latter. Therefore, transient variations are less likely to occur.

According to the present disclosure, adverse effects of transient variations occurring in the output frequency of the frequency sweep circuit can be lessened.

BRIEF DESCRIPTION OF THE DRAWINGS

FIG. 6 is a table showing the example of division ratio control corresponding to FIG. 4 in the case of using the frequency sweep circuit of FIG. 2.

DETAILED DESCRIPTION

Embodiments of the present disclosure will be described hereinafter in detail with reference to the accompanying drawings.

First Embodiment

Figure 1:
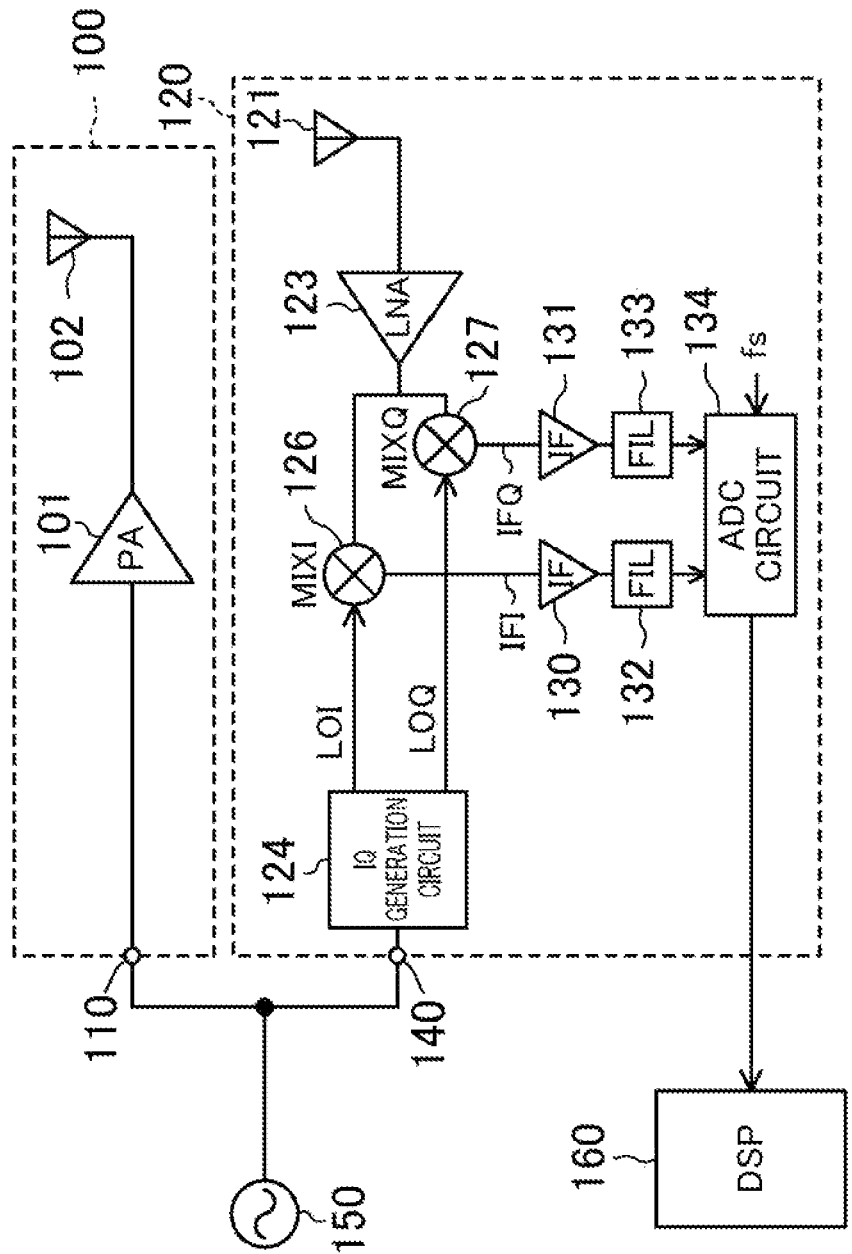
FIG. 1 is a circuit block diagram of a radar device according to the first embodiment.

FIG. 1 is a circuit block diagram of a radar device according to the first embodiment. The radar device of FIG. 1 includes a transmission system 100, a receiving system 120, a frequency sweep circuit 150 that outputs a local oscillation signal, and a digital signal processor (DSP) 160 responsible for control of the entire radar device.

The transmission system 100 includes a transmission input 110 that receives the local oscillation signal from the frequency sweep circuit 150, a power amplifier (PA) 101 that amplifies the local oscillation signal received via the transmission input 110 to generate a transmission signal, and a transmitting antenna 102 that sends the transmission signal out to a target as an electromagnetic wave.

The receiving system 120 includes a receiving input 140 that receives the local oscillation signal from the frequency sweep circuit 150 aside from the transmission input 110, a receiving antenna 121 that receives a reflected wave from the target based on the transmission signal, a low noise amplifier (LNA) 123, an IQ generation circuit 124, mixers (MIXI and MIXQ) 126 and 127, and an analog-to-digital conversion (ADC) circuit 134.

Also, IF amplifiers 130 and 131 and filters 132 and 133 are respectively provided on the routes for an IFI signal and an IFQ signal between the mixers 126 and 127 and the ADC circuit 134.

Figure 2:
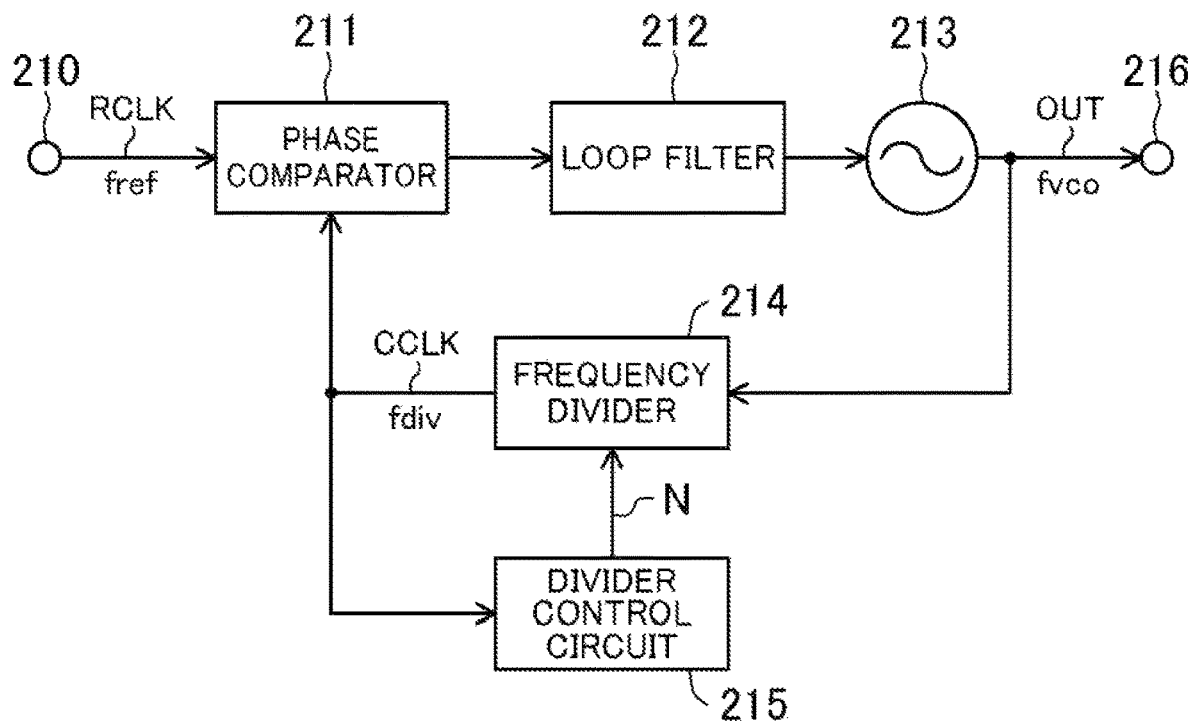
FIG. 2 is a block diagram showing a configuration of a frequency sweep circuit in FIG. 1.

FIG. 2 shows a configuration of the frequency sweep circuit 150 in FIG. 1. The frequency sweep circuit 150 of FIG. 2 includes an input terminal 210, a phase comparator 211, a loop filter 212, a voltage-controlled oscillator (VCO) 213, a frequency divider 214, a divider control circuit 215, and an output terminal 216. A reference frequency signal RCLK having a constant reference frequency fref is input into the input terminal 210. The reference frequency signal RCLK can be supplied from a crystal oscillator, for example. The output terminal 216 is connected with an output frequency signal OUT having a variable output frequency fvco. The voltage-controlled oscillator 213 outputs the output frequency signal OUT as an oscillation signal based on a phase-compared signal supplied from the phase comparator 211 via the loop filter 212. The output frequency signal OUT is fed to the transmission input 110 and the receiving input 140 as the local oscillation signal. The divider control circuit 215 outputs a divider control signal that specifies a division ratio N. The frequency divider 214 receives the output frequency signal OUT, divides the output frequency signal OUT by the division ratio N specified by the divider control signal, and outputs a divided frequency signal CCLK having a divided frequency fdiv. The phase comparator 211 compares the phases between the reference frequency signal RCLK and the divided frequency signal CCLK and outputs the phase-compared signal. The divider control circuit 215 receives the divided frequency signal CCLK from the frequency divider 214 for timing control. Note however that the divider control circuit 215 may receive the reference frequency signal RCLK in place of the divided frequency signal CCLK.

According to the frequency sweep circuit 150 in FIG. 1, fvco=fref×N is established, indicating that the output frequency fvco changes in proportion to the division ratio N.

Figure 3:
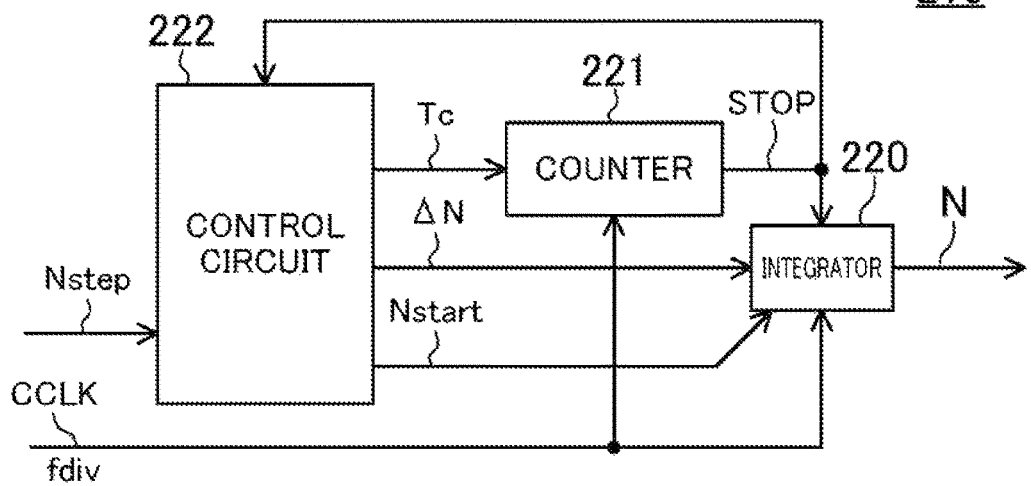
FIG. 3 is a block diagram showing a detailed configuration example of a divider control circuit in FIG. 2.

FIG. 3 shows a detailed configuration example of the divider control circuit 215 in FIG. 2. The divider control circuit 215 of FIG. 3 includes an integrator 220, a counter 221, and a control circuit 222. The control circuit 222 receives a division ratio spacing Nstep between frequency sequences, supplies two signals specifying an initial value Nstart of the division ratio and an increment ΔN of the division ratio per clock to the integrator 220, and also supplies a signal specifying the length Tc of one frequency sequence, i.e., the time during which the increment ΔN should be adopted, to the counter 221.

After setting the initial value Nstart, the integrator 220 adds the increment ΔN every clock of the divided frequency signal CCLK, thereby outputting the divider control signal specifying the division ratio N that changes in the increments ΔN with the lapse of time from the initial value Nstart. Note that the division ratio N increases with the lapse of time when the increment ΔN is a positive value, decreases with the lapse of time when the increment ΔN is a negative value, and holds a fixed value when the increment ΔN is 0.

The counter 221 counts the number of clocks of the divided frequency signal CCLK, and outputs a count end signal STOP once the count reaches a number corresponding to the set time Tc, i.e., when the time Tc has elapsed. Receiving the count end signal STOP, the control circuit 222 updates the three outputs, Nstart, ΔN, and Tc. Receiving the count end signal STOP, also, the integrator 220 starts next operation with the updated Nstart and ΔN.

Figure 4:
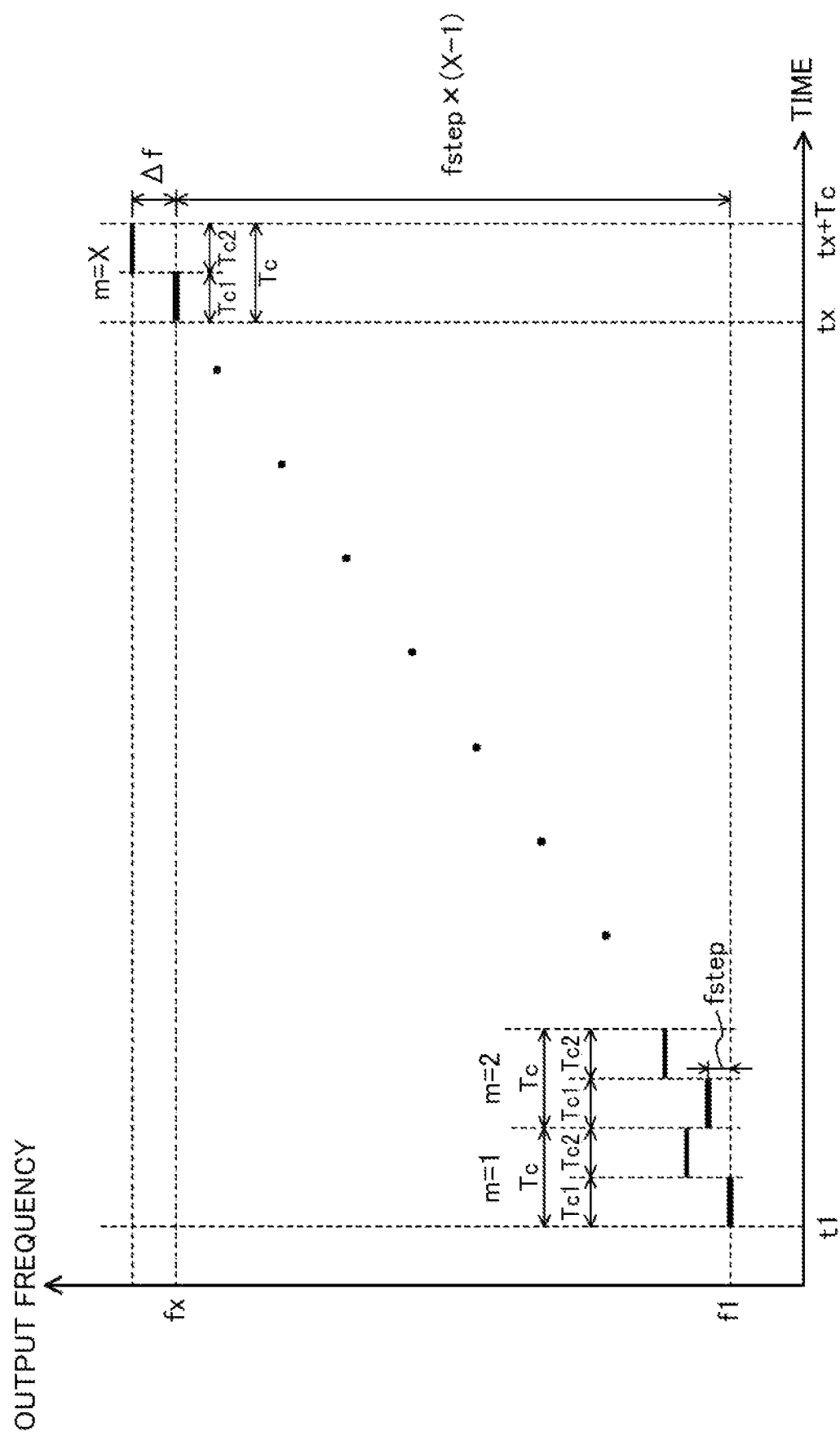
FIG. 4 is a graph showing an ideal temporal change in a frequency sweep circuit.

FIG. 4 is a graph showing an ideal temporal change of the output frequency fvco of the frequency sweep circuit 150. In FIG. 4, the period from time t1 to time tx+Tc is an up-chirp period during which the output frequency fvco is raised from a first frequency f1 to a second frequency fx+Δf (f1<fx) roughly linearly. The frequency sweep circuit 150 repeats the operation from time t1 to time tx+Tc. The frequency sweep in this up-chirp period is used for distance measurement.

In FIG. 4, the number m of frequency sequences during the period from time t1 to time tx+Tc is X. In other words, in FIG. 4, the period of Tc is repeated X times (tx+Tc−t1=Tc×X). The frequency sweep circuit 150 outputs two output frequency signals OUT (output frequency=fvco) having a frequency spacing of Δf (Δf>0) therebetween in each frequency sequence. Between the frequency sequences, also, a frequency spacing fstep (fstep<Δf) based on the division ratio spacing Nstep is set. In other words, when a frequency sequence is switched to a next frequency sequence, the division ratio spacing Nstep is added to the division ratio N in the next frequency sequence, whereby the frequency spacing fstep is added to the frequency value. This is repeated (X−1) times (see FIG. 6). Out of the length Tc, the length until the switching of the output frequency fvco is denoted by Tc1, and the remaining length after the switching is denoted by Tc2. While Tc1=Tc2 in FIG. 4, the lengths of Tc1 and Tc2 may be different from each other.

Figure 5:
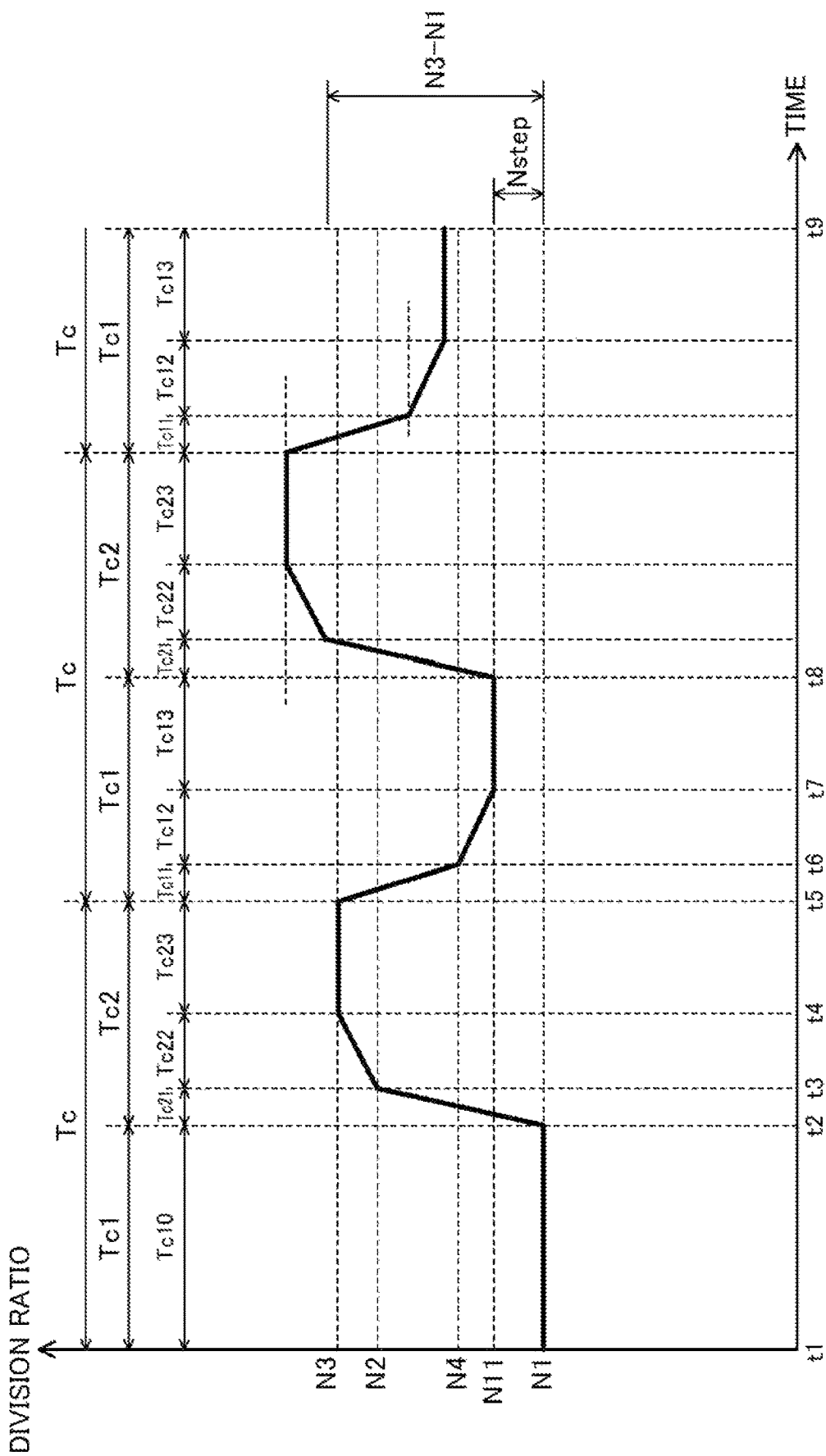
FIG. 5 is a graph showing an example of division ratio control corresponding to FIG. 4 in the case of using the frequency sweep circuit of FIG. 2.

FIG. 5 is a graph showing an example of division ratio control corresponding to FIG. 4 in the case of using the frequency sweep circuit of FIG. 2.

As shown in FIG. 5, a first division ratio N1 (=f1/fref) is continued during the period from time t1 to time t2 (length: Tc1).

The division ratio is then linearly increased from the first division ratio N1 to a second division ratio N2 (=f2/fref) (N1<N2) during the period from time t2 to time t3 (length: Tc21). Further, it is linearly increased from the second division ratio N2 to a third division ratio N3 (=f3/fref) (N2<N3) during the period from time t3 to time t4 (length: Tc22), and the third division ratio N3 is continued during the period from time t4 to time t5 (length: Tc23). The length from time t2 to time t5 corresponds to Tc2.

Subsequently, the division ratio is linearly decreased from the third division ratio N3 to a fourth division ratio N4 (=f4/fref) (N3>N4) during the period from time t5 to time t6 (length: Tc11). Further, it is linearly decreased from the fourth division ratio N4 to a first division ratio N11 in the next frequency sequence (=f11/fref=f1/fref+Nstep) (N4>N11) during the period from time t6 to time t7 (length: Tc12), and the first division ratio N11 is continued during the period from time t7 to time t8 (length: Tc13). The length from time t5 to time t8 corresponds to Tc1.

Thereafter, the operation from time t2 until time t8 is repeated. Note that the division ratio spacing Nstep is added every repetition of the operation (see time t8 to time t9 in FIG. 5).

Here, the control is such that the absolute value of the time rate of change (inclination of the graph) of the division ratio N in the increase from the second division ratio N2 to the third division ratio N3 during the period from time t3 to time t4 is smaller than the absolute value of the time rate of change (inclination of the graph) of the division ratio N in the increase from the first division ratio N1 to the second division ratio N2 during the period from time t2 to time t3.

Similarly, the control is such that the absolute value of the time rate of change (inclination of the graph) of the division ratio N in the decrease from the fourth division ratio N4 to the first division ratio N11 during the period from time t6 to time t7 is smaller than the absolute value of the time rate of change (inclination of the graph) of the division ratio N in the decrease from the third division ratio N3 to the fourth division ratio N4 during the period from time t5 to time t6.

Figure 7:
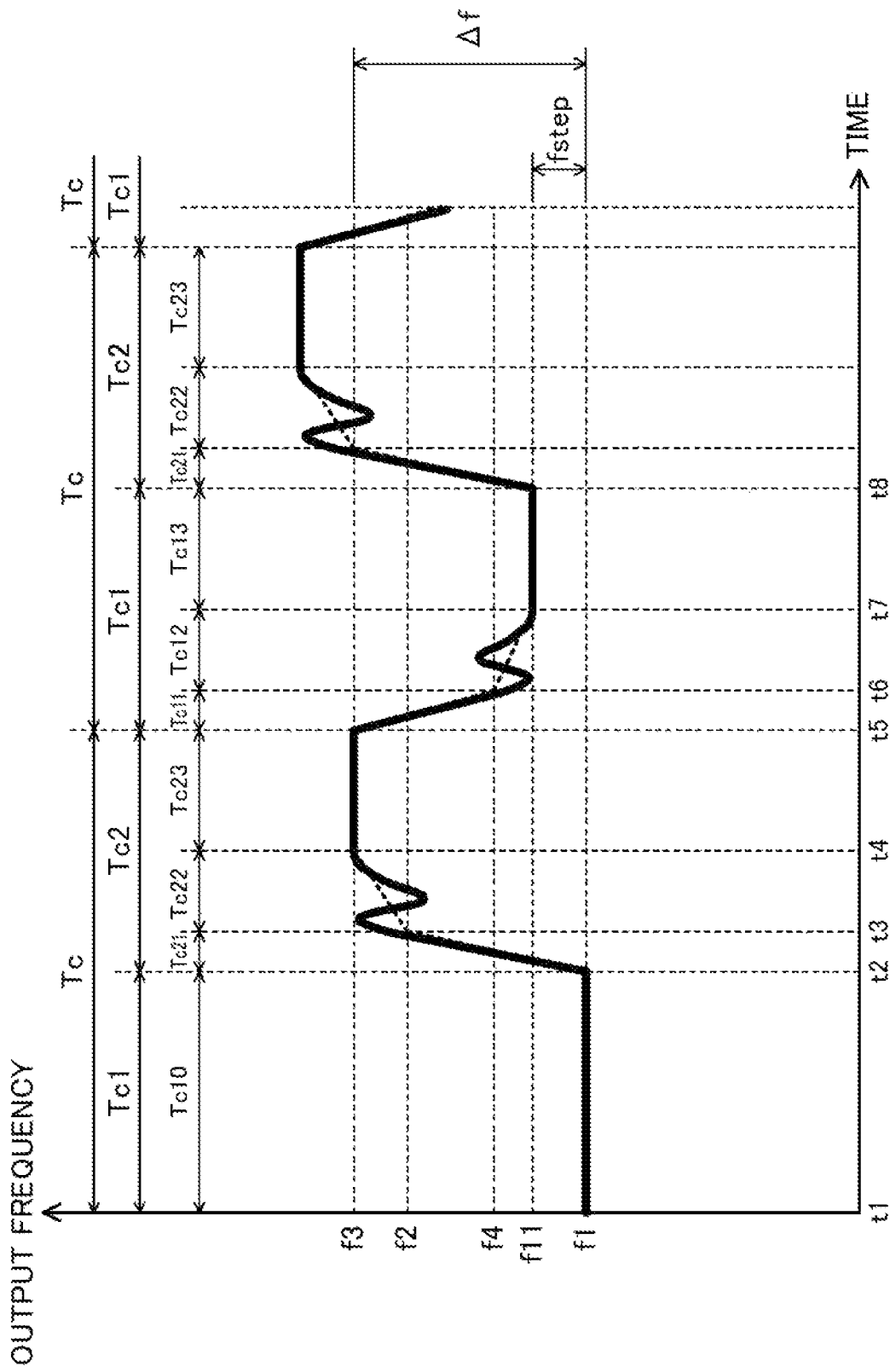
FIG. 7 is a graph showing an example of actual temporal change of an output frequency fvco under the division ratio control of FIG. 5.

FIG. 7 is a graph showing an example of actual temporal change of the output frequency fvco under the division ratio control of FIG. 5.

As shown in FIG. 7, since the absolute value of the time rate of change of the division ratio N during the increase from the first division ratio N1 to the second division ratio N2 (from time t2 to time t3) is great, an overshoot occurs in the output frequency fvco at the timing of switching from the first division ratio N1 to the second division ratio N2. However, by setting the second division ratio N2 foreseeing this transient phenomenon, the variation of the output frequency fvco caused by the overshoot can be contained within a predetermined frequency bandwidth (e.g., from the first frequency f1 to a third frequency f3). Moreover, the time required until the frequency is stabilized at the time of frequency transition can be shortened.

Similarly, since the absolute value of the time rate of change of the division ratio N during the decrease from the third division ratio N3 to the fourth division ratio N4 (from time t5 to time t6) is great, an undershoot occurs in the output frequency fvco at the timing of switching from the third division ratio N3 to the fourth division ratio N4. However, by setting the fourth division ratio N4 foreseeing this transient phenomenon, the variation of the output frequency fvco caused by the undershoot can be contained within a predetermined frequency bandwidth (e.g., from the third frequency f3 to a first frequency f11). Moreover, the time required until the frequency is stabilized at the time of frequency transition can be shortened.

Alterations

The configuration of the above embodiment may be altered as follows. Note however that the concrete operations and advantages of alterations to follow are similar to those of the above embodiment and therefore detailed description thereof is omitted here.

For example, in the above embodiment, the division ratio is increased in two steps, linearly in each step, from the first division ratio N1 to the second division ratio N2 and from the second division ratio N2 to the third division ratio N3 during the period from time t2 to time t4. The control is not limited to this, but the division ratio may be increased in three or more steps.

Figure 8:
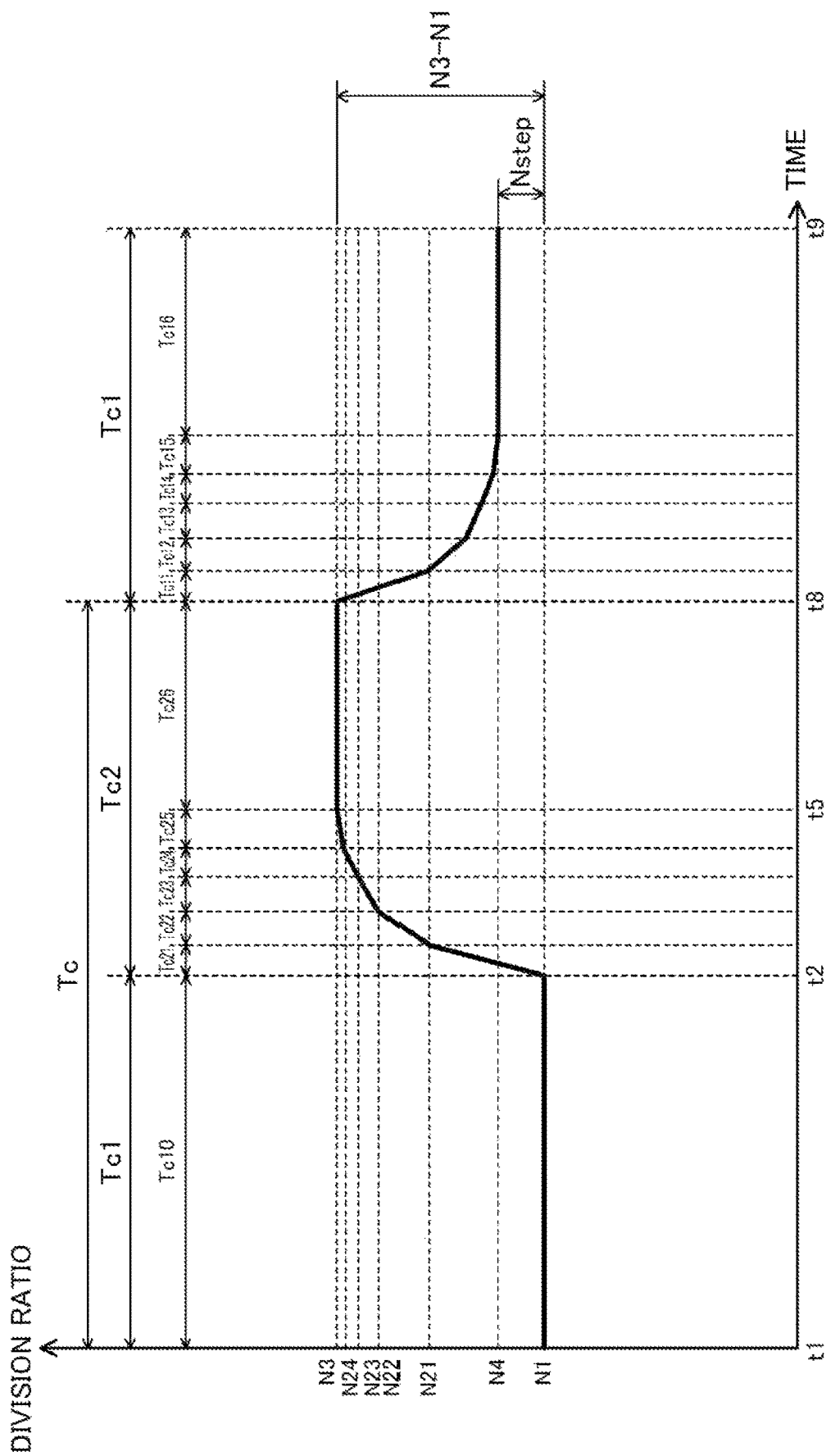
FIG. 8 is a graph showing another example of division ratio control of FIG. 5.

FIG. 8 illustrates an example in which the division ratio is increased in six steps during the period from time t2 to time t5. In FIG. 8, the absolute value of the time rate of change (inclination of the graph) of the division ratio N becomes smaller as the step shifts upwardly in the phase of increasing the division ratio N, or as the step shifts downwardly in the phase of decreasing the division ratio. With this, the overshoot/undershoot amounts can be further reduced.

Figure 9:
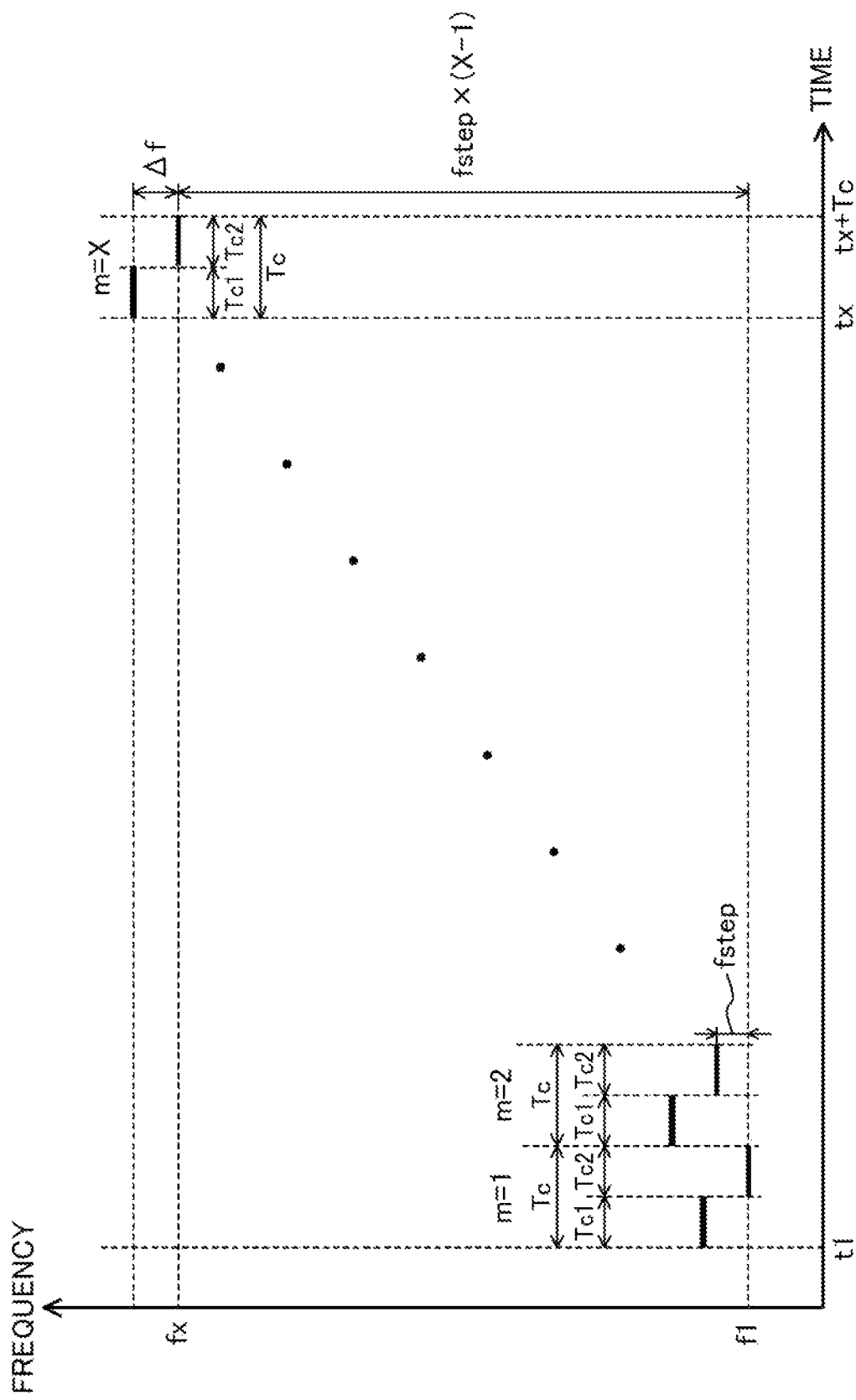
FIG. 9 is a graph showing an ideal temporal change in another example of the frequency sweep circuit.

In the above embodiment, the frequency spacing Δf between the output frequency signals OUT within each frequency sequence is assumed to be plus (Δf>0). Alternatively, as shown in FIG. 9, the frequency spacing Δf between the output frequency signals OUT within each frequency sequence may be minus ((Δf<0).

In the above embodiment, two output frequency signals OUT having a frequency spacing Δf (Δf>0) therebetween are output in each frequency sequence. The configuration is not limited to this, but three or more output frequency signals OUT may be output.

Figure 10:
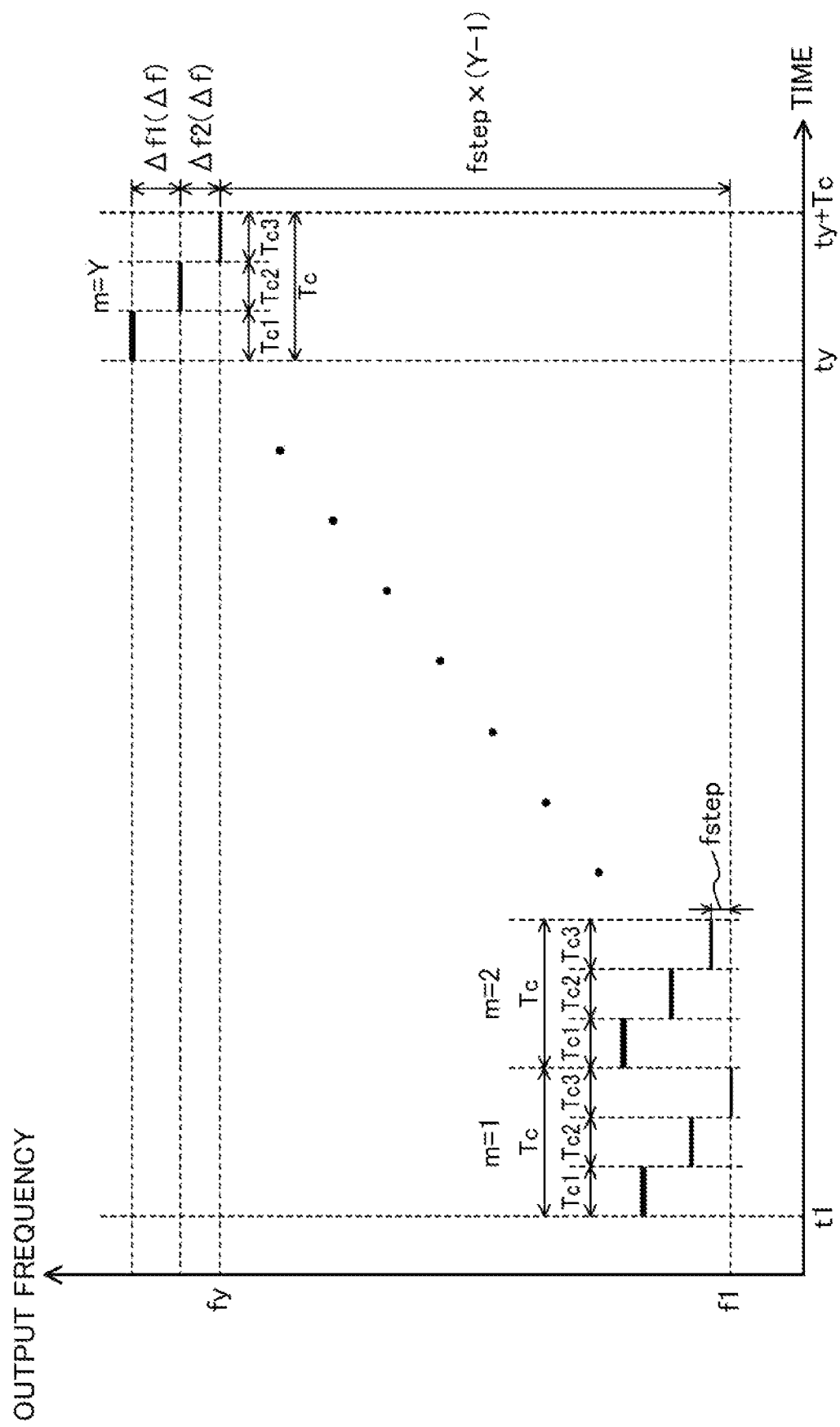
FIG. 10 is a graph showing an ideal temporal change in yet another example of the frequency sweep circuit.

FIG. 10 illustrates an example in which the frequency sweep circuit 150 outputs three output frequency signals OUT having a minus frequency spacing Δf (Δf<0) among them in each frequency sequence. As shown in FIG. 10, a frequency spacing Δf1 (Δf1<0) between the first output frequency signal OUT (length: Tc1) and the second output frequency signal OUT (length: Tc2) may be equal to, or different from, a frequency spacing Δf2 (Δf2<0) between the second output frequency signal OUT (length: Tc2) and the third output frequency signal OUT (length: Tc3).

Further, in the above embodiment, the operation from time t1 until time ty+Tc (up-chirp period) is repeated in the frequency sweep circuit 150. The operation is not limited to this. For example, although concrete illustration is omitted, the frequency sweep circuit 150 may have down-chirp characteristics in which the output frequency fvco is dropped from the first frequency f1 to a second frequency fx−Δf (f1>fx, Δf>0) roughly linearly within a predetermined period, and this down-chirp period may be repeated.

Second Embodiment

Figure 11:
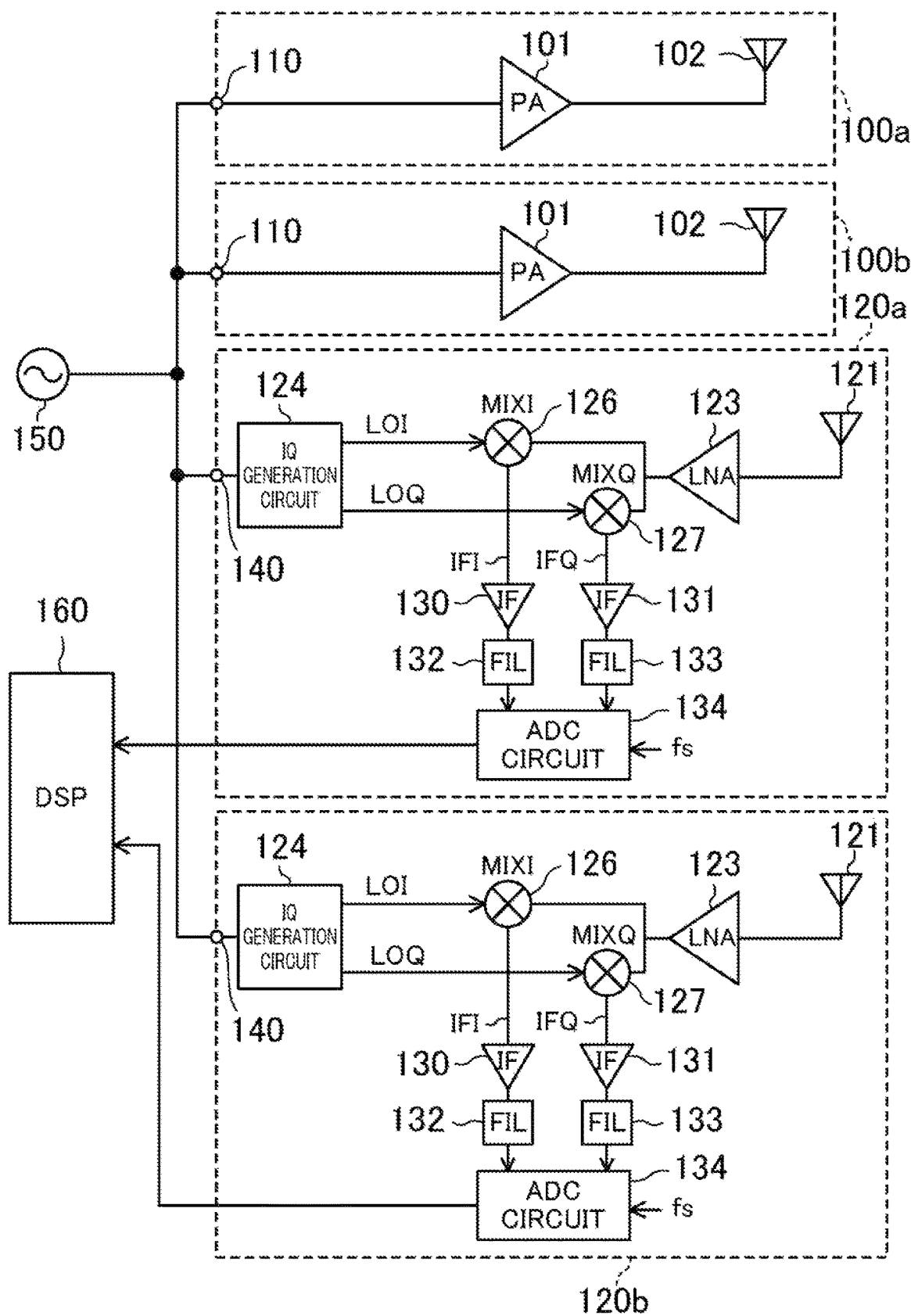
FIG. 11 is a circuit block diagram of a radar device according to the second embodiment.

FIG. 11 is a circuit block diagram of a radar device according to the second embodiment of the present disclosure. The radar device of FIG. 11 includes two transmission-system circuits 100a and 100b each having the configuration of the transmission system 100 in FIG. 1, two receiving-system circuits 120a and 120b each having the configuration of the receiving system 120 in FIG. 1, a frequency sweep circuit 150 that outputs a local oscillation signal, and a DSP 160 responsible for control of the entire radar device. In FIG. 11, also, the configuration shown in FIGS. 2 and 3 is applicable as the configuration of the frequency sweep circuit 150, and similar advantages are obtained.

As described above, the frequency sweep circuit according to the present disclosure has an advantage of lessening adverse effects of transient variations occurring in the output frequency, and thus is useful as a frequency sweep circuit for a distance measurement sensor, etc.

What is claimed is:

1. A frequency sweep circuit configured to output a plurality of oscillation signals having a frequency spacing between the signals, comprising:
    an input terminal into which a reference frequency signal is input;
    an output terminal connected to an output frequency signal;
    a voltage-controlled oscillator that outputs the output frequency signal based on a phase-compared signal;
    a divider control circuit that outputs a divider control signal;
    a frequency divider into which the output frequency signal is input and that divides the frequency of the output frequency signal by a division ratio specified by the divider control signal and outputs a divided frequency signal; and
    a phase comparator that compares phases between the reference frequency signal and the divided frequency signal and outputs the phase-compared signal,
wherein
    the divider control circuit outputs the divider control signal that is meant to increase the division ratio from a first division ratio through a second division ratio greater than the first division ratio to a third division ratio greater than the second division ratio and then return the division ratio through a fourth division ratio smaller than the third division ratio to a fifth division ratio smaller than the fourth division ratio and greater than the first division ratio, and
    control is exerted so that the absolute value of a time rate of change of the division ratio in the increase from the second division ratio to the third division ratio is smaller than the absolute value of a time rate of change of the division ratio in the increase from the first division ratio to the second division ratio.

2. The frequency sweep circuit of claim 1, wherein
    control is exerted so that the absolute value of a time rate of change of the division ratio in the decrease from the fourth division ratio to the fifth division ratio is smaller than the absolute value of a time rate of change of the division ratio in the decrease from the third division ratio to the fourth division ratio.

3. The frequency sweep circuit of claim 1, wherein
    the second division ratio is constituted by a plurality of second division ratios having a frequency spacing directed toward sequentially increasing, and
    control is exerted so that the absolute value of a time rate of change of the division ratio between adjacent ones of the second division ratios becomes smaller as the division ratio is closer to the third division ratio and that the absolute value of a time rate of change of the division ratio in an increase from a maximum one of the second division ratios to the third division ratio is smaller than the absolute value of the time rate of change of the division ratio between adjacent ones of the second division ratios.

4. A frequency sweep circuit configured to output a plurality of oscillation signals having a frequency spacing set between the signals, comprising:
    an input terminal into which a reference frequency signal is input;
    an output terminal connected to an output frequency signal;
    a voltage-controlled oscillator that outputs the output frequency signal based on a phase-compared signal;
    a divider control circuit that outputs a divider control signal;
    a frequency divider into which the output frequency signal is input and that divides the frequency of the output frequency signal by a division ratio specified by the divider control signal and outputs a divided frequency signal; and
    a phase comparator that compares phases between the reference frequency signal and the divided frequency signal and outputs the phase-compared signal,
wherein
    the divider control circuit outputs the divider control signal that is meant to decrease the division ratio from a first division ratio through a second division ratio smaller than the first division ratio to a third division ratio smaller than the second division ratio and then return the division ratio through a fourth division ratio greater than the third division ratio to a fifth division ratio greater than the fourth division ratio and smaller than the first division ratio, and
    control is exerted so that the absolute value of a time rate of change of the division ratio in the decrease from the second division ratio to the third division ratio is smaller than the absolute value of a time rate of change of the division ratio in the decrease from the first division ratio to the second division ratio.

5. The frequency sweep circuit of claim 4, wherein
    control is exerted so that the absolute value of a time rate of change of the division ratio in the increase from the fourth division ratio to the fifth division ratio is smaller than the absolute value of a time rate of change of the division ratio in the increase from the third division ratio to the fourth division ratio.

6. The frequency sweep circuit of claim 4, wherein
    the second division ratio is constituted by a plurality of second division ratios having a frequency spacing directed toward sequentially decreasing, and
    control is exerted so that the absolute value of a time rate of change of the division ratio between adjacent ones of the second division ratios becomes smaller as the division ratio is closer to the third division ratio and that the absolute value of a time rate of change of the division ratio in a decrease from a minimum one of the second division ratios to the third division ratio is smaller than the absolute value of the time rate of change of the division ratio between adjacent ones of the second division ratios.

7. A radar device comprising the frequency sweep circuit of claim 1.

8. A radar device comprising the frequency sweep circuit of claim 4.

* * * * *